Patented Apr. 18, 1944

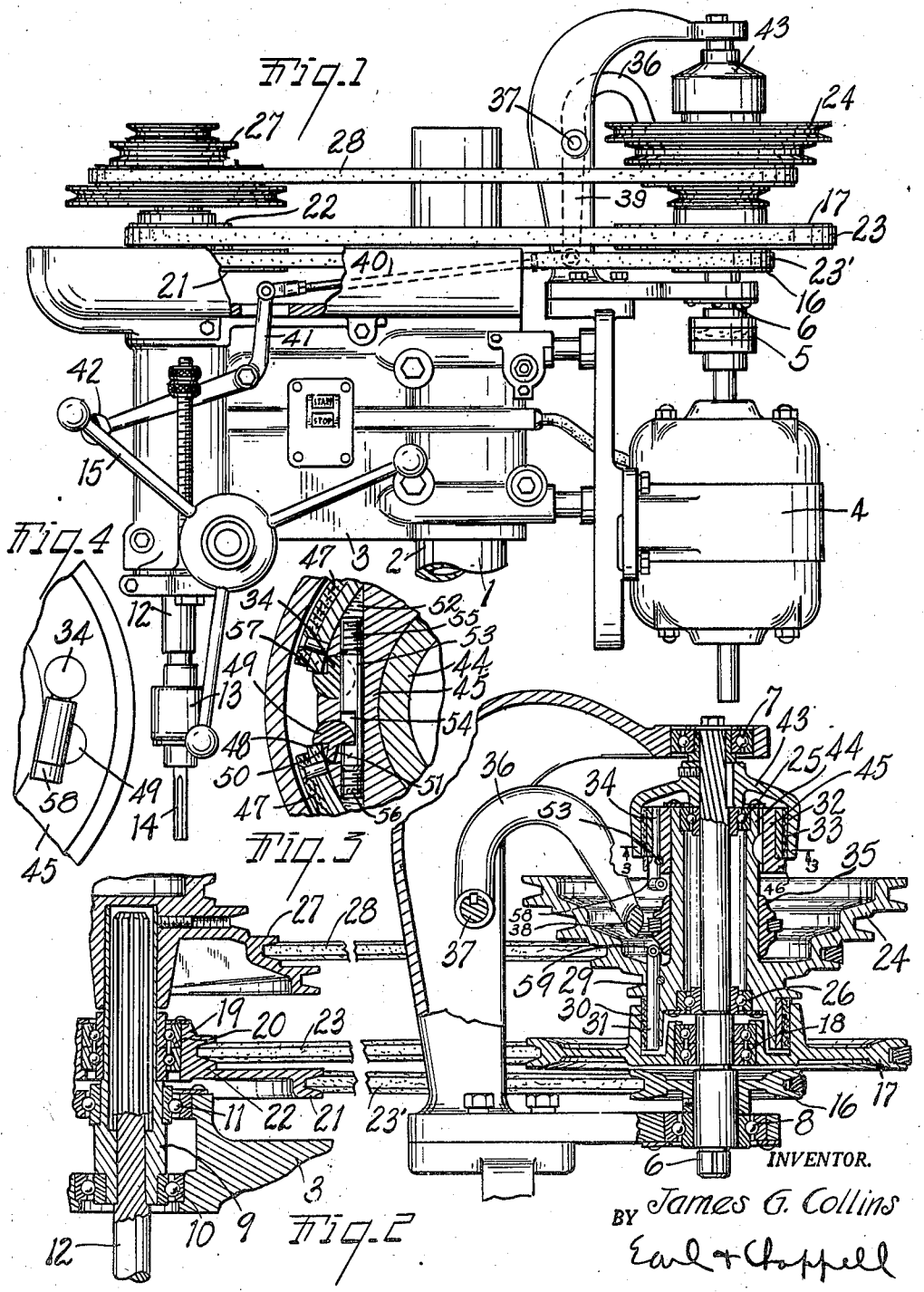

2,346,731

UNITED STATES PATENT OFFICE 2,346,731

DRILL PRESS

James G. Collins, Kalamazoo, Mich., assignor to Atlas Press Company, Kalamazoo, Mich.

Application April 8, 1942, Serial No. 438,175

1 Claim. (Cl. 74—217)

This invention relates to improvements in drill presses.

This invention relates to drill presses and primarily to the drives therefor. It is a continuation in part of my application Serial No. 409,921, filed September 8, 1941, for Drill presses. It has for its objects:

First, to provide a new and improved drive for a drill press.

Second, to provide such a drive which may be used to change the speed of rotation of the quill and spindle while the drill press is in operation.

Third, to provide such a drive which is simple and compact and may be made inexpensively.

Other objects and advantages pertaining to details and economies of construction and operation will appear from the description to follow. The invention is defined in the claim. A preferred embodiment of my invention is illustrated in the accompanying drawing, in which:

Fig. 1 is a side elevation of the upper portion of a drill press embodying my improved drive.

Fig. 2 is a view partially in section showing the elements of my improved drive.

Fig. 3 is a detail sectional view taken on the line 3—3 of Fig. 2.

Fig. 4 is a detail view of the bottom of the top clutch shown in Fig. 2.

The drill press consists of a suitable base or support 1 which includes a column 2 upon which the head 3 may be adjusted. The head 3 has mounted thereon a motor 4 having a suitable driving connection 5 to a drive shaft 6 which is journaled in bearings 7 and 8. The head also carries a quill 9 journaled in bearings 10 and 11. A spindle 12 is splined in the quill as indicated in Fig. 2. On the spindle is mounted a suitable chuck 13 of the type which may be operated while the drill press is in operation to remove the tool 14 which is shown as a reamer, but which may be a drill or a tap. The spindle is controlled in the conventional way by the hand levers 15.

Fixed to the drive shaft is a small pulley 16. Directly above it is disposed a large pulley 17 which is mounted on bearings 18 for free rotation about the drive shaft. A double integral pulley 19 is mounted on a bearing 20 for free rotation about the quill 9. This pulley consists of a larger pulley 21 and a smaller pulley 22. A V-belt 23' connects the pulley 16 with the pulley 21 and a V-belt 23 connects the pulley 17 with the pulley 22, thus providing a reduction drive.

Multiple step driving pulley 24 is mounted for free rotation about the drive shaft 6 on bearings 25 and 26. A cooperating multiple step driven pulley 27 is fixed to the quill 9 for driving the same. A V-belt 28 connects the pulleys 24 and 27. It may be arranged on the various steps of these pulleys to give variations in the speed of rotation of the quill.

I provide suitable friction clutch means 29 connecting the pulley 17 with the pulley 24. These clutch means consist of a friction band 30 and actuating members 31 which are conventional. I provide a second friction clutch means 32 consisting of friction band 33 and actuating members 34 similar to those provided for said first mentioned clutch. The clutch 32 connects the drive shaft directly with the pulley 24.

The top friction clutch consists of a housing 43 fixed to the shaft 6 and a sleeve 44 fixed to the pulley on which is mounted a sleeve 45 with a flange 46 for supporting the friction band 33 which lies loosely between the housing 43 and the sleeve 45.

The friction band 33 is split and consists of friction material 47 on a suitable metallic ring 48. One end of the ring 48 engages the member 49 which consists of a shaft mounted in the sleeve 45 in a vertical bore having a cut out portion 50 in which the end of the ring 48 lies. Another cut out portion 51 is provided.

A cross bore 52 is provided in the sleeve 45. Within it is a sliding member 53 having a cut out portion 54 which engages the member 49 as shown in Fig. 3. Allen screws 55 and 56 in the bore adjust the position of the member 53 and thereby determine the position of the member 49.

The member 34 lies in a vertical bore in the sleeve 45 and is cut out at 57 to engage the other end of the band 48 as shown in Fig. 3. Rotation of the member 34 in a clockwise direction as viewed in Fig. 3 tends to expand the ring 48 and bring the friction material 47 against the housing 43, thus engaging the clutch. A turning of the member 34 in a counterclockwise direction disengages the clutch. At the end of the member 34 is a right angle lever arm 58 having a roller thereon. When the member 35 is shifted upwardly, it engages the lever arm 58 to turn the member 34 in a clockwise direction as viewed in Fig. 3 and engage the upper clutch. When the member 35 is shifted downwardly as viewed in Fig. 2, the clutch is disengaged.

The construction of the bottom clutch is identical in all material respects, the member 31 corresponding to the member 34 and operating in the same way through engagement with the member 35 of its right angle lever arm 59.

I provide a shiftable member 35 for selectively engaging either the clutch 29 or the clutch 32. When one clutch is engaged, the other is disengaged. This member is slidable axially of the drive shaft in a conventional manner to engage either the members 31 or 34 so that the drive can be either the reduction drive through pulleys 16, 21, 22, 17, 24 and 27, or a more direct drive from the drive shaft 6 directly to pulley 24 and thence to driven pulley 27.

I provide means for shifting the shiftable member 35 consisting of a lever 36 pivoted at 37 having one end 38 engaging the shifter and the other end 39 connected by a link 40 to a bell crank lever 41. The free end 42 of the bell crank lever is located adjacent the quill so it can be controlled by the operator of the press.

When the motor is operating, the operator can by manipulating the lever 42, shift from the more direct drive to the reduction drive using the more direct drive for drilling and using the reduction drive for either tapping or reaming. It is not necessary for the operator to stop the press during this operation which makes the drill press highly efficient in operation. The parts are standard parts and may be assembled simply and easily. They are disposed compactly and do not add to the bulk or the cost of the press to any appreciable extent.

The terms and expressions which have been herein employed are used as terms of description and not of limitation, and there is no intention in the use of such terms and expressions of excluding any equivalents of the features shown and described. It is recognized that various modifications are possible within the scope of the invention claimed.

Having thus described my invention, what I claim as new and desire to secure by Letters Patent is:

In a drill press having a base and a drive shaft and parallel quill, the combination of speed reduction pulleys comprising a small pulley fixed to said drive shaft, a double pulley comprising pulleys of different size journaled for free rotation, a large pulley journaled for free rotation about said drive shaft, a V-belt connecting the small pulley on said drive shaft with the larger pulley on the double pulley, a V-belt connecting the small pulley of said double pulley with said large pulley journaled on said drive shaft, a driving pulley journaled for free rotation about said drive shaft, a cooperating driven pulley fixed to said quill and a V-belt connecting said last mentioned pulleys, a first releasable friction clutch means adapted to establish driving connection between said large pulley journaled about said drive shaft and said driving pulley, a second releasable clutch means adapted to establish a driving connection directly between said drive shaft and said driving pulley, and shiftable means for selectively engaging either said first or second clutch means, whereby the speed of rotation of the quill may be changed while the drill press is in operation.

JAMES G. COLLINS.